United States Patent
Buettgen et al.

(10) Patent No.: US 9,341,715 B2
(45) Date of Patent: May 17, 2016

(54) MULTI-LEVEL DIGITAL MODULATION FOR TIME OF FLIGHT METHOD AND SYSTEM

(75) Inventors: Bernhard Buettgen, Adliswil (CH); Thierry Oggier, Zurich (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 681 days.

(21) Appl. No.: 13/082,000

(22) Filed: Apr. 7, 2011

(65) Prior Publication Data

US 2011/0299059 A1    Dec. 8, 2011

Related U.S. Application Data

(60) Provisional application No. 61/321,574, filed on Apr. 7, 2010.

(51) Int. Cl.
| | | |
|---|---|---|
| G01C 3/08 | (2006.01) | |
| H05B 41/24 | (2006.01) | |
| G01S 17/89 | (2006.01) | |
| G01S 7/491 | (2006.01) | |
| G01S 17/32 | (2006.01) | |
| G01S 7/481 | (2006.01) | |

(52) U.S. Cl.
CPC .............. *G01S 17/89* (2013.01); *G01S 7/4815* (2013.01); *G01S 7/4911* (2013.01); *G01S 17/32* (2013.01)

(58) Field of Classification Search
CPC ......................................................... G01C 3/08
USPC ....................................................... 356/5.01
See application file for complete search history.

(56) References Cited

U.S. PATENT DOCUMENTS

| | | | |
|---|---|---|---|
| 3,456,199 A | 7/1969 | Gerwen | |
| 5,337,052 A * | 8/1994 | Lohrmann et al. | 342/68 |
| 6,031,601 A * | 2/2000 | McCusker et al. | 356/5.01 |
| 7,268,858 B2 * | 9/2007 | Kuijk et al. | 356/5.01 |
| 7,462,808 B2 | 12/2008 | Lustenberger et al. | |
| 2003/0048430 A1 * | 3/2003 | Morcom | 356/5.01 |
| 2010/0208231 A1 | 8/2010 | Murai | |

FOREIGN PATENT DOCUMENTS

| | | |
|---|---|---|
| JP | 56069941 A | 6/1981 |
| WO | 2008/111675 A1 | 9/2008 |
| WO | WO 2009135952 A2 * | 11/2009 |

OTHER PUBLICATIONS

Buttgen, B. et al., "Robust Optical Time-of-Flight Range Imaging Based on Smart Pixel Structures," Jul. 2008, IEEE Transactions on Circuits and Systems I: Regular Papers, vol. 55, No. 6, pp. 1512-1525.*

(Continued)

*Primary Examiner* — Luke Ratcliffe
*Assistant Examiner* — Vicente Rodriguez
(74) *Attorney, Agent, or Firm* — Fish & Richardson P.C.

(57) ABSTRACT

The modulation scheme disclosed in this invention report allows for utilizing multiple 3D time-of-flight cameras at the same time by exploiting the inherent pseudo noise properties of the optical modulation signals. Compared to recent systems based on pure pseudo noise modulation signals, the stochastic measurement error in a single-camera environment is significantly reduced. The basic concept relies on the generation of a three level optical modulation signal that includes two pseudo noise sequences.

17 Claims, 17 Drawing Sheets

(56) References Cited

OTHER PUBLICATIONS

International Preliminary Report on Patentability dated Oct. 18, 2012 from counterpart International Application No. PCT/US2011/031569, filed on Apr. 7, 2011.

Buettgen, B. "Extending Time-of-Flight Optical 3D-Imaging to Extreme Operating Conditions," Ph.D. Thesis, University of Neuchatel, 2006, 209 pages.

Buettgen, B. et al., "Pseudonoise Optical Modulation for Real-Time 3-D Imaging with Minimum Interference," IEEE Transactions on Circuits and Systems I: Regular Papers, vol. 54, No. 10, Oct. 2007, pp. 2109-2119.

Buettgen, B. et al., "Robust Optical Time-of-Flight Range Imaging Based on Smart Pixel Structures," IEEE Transactions on Circuits and Systems I: Regular Papers, vol. 55, No. 6, Jul. 2008, pp. 1512-1525.

Zepernick, H. et al., "Psuedo Random Signal Processing: Theory and Application," Wiley, 2005, pp. 44-47, 86-91.

International Search Report mailed Aug. 19, 2011, from counterpart International Application No. PCT/US2011/031569, filed on Apr. 7, 2011.

\* cited by examiner

MULTI-LEVEL DIGITAL MODULATION FOR TIME OF FLIGHT METHOD AND SYSTEM

RELATED APPLICATIONS

This application claims the benefit under 35 USC 119(e) of U.S. Provisional Application No. 61/321,574, filed on Apr. 7, 2010, which is incorporated herein by reference in its entirety.

BACKGROUND OF THE INVENTION

Time-of-flight distance measurement systems are active systems that exploit the propagation of a signal to an object and back to the sensor at a limited, but well-known speed. The kind of signal carrier typically is manifold, ultra sonic, water or electromagnetic waves. Any time-of-flight measurement system, however, works in the same principle independent on the form of the carrier used. A general set-up scheme for time-of-flight distance measurement systems is shown in FIG. 1. The distance information is calculated as:

$$R = \frac{vT}{2}$$

where R is the distance between the measurement system 100 and the object 10, v is the propagation speed of the signal 114 from the signal source 110 and T is the measured time needed for the signal to travel between the measurement system 100 and the object 10 forth and back and then detected by the sensor 112.

The measurement of the time-of-flight T requires the modulation of the signal 114. In optical measurement systems this is usually an intensity modulation scheme. So-called continuous wave signals such as sinusoidal or pulse-chain are widely used. Examples of these signals 114 are shown in FIG. 2.

The time-of-flight measurement is usually accomplished by correlating the detected modulation signal d(t) with a reference signal r(t). A block diagram of the receiver-wise incorporated correlator is shown in FIG. 3. The detected signal is the delayed version of the emitted signal e(t) due to its travel between the measurement system 100 and the object 10. This delay is expressed by the time-of-flight T. In addition, any losses of signal power within the measurement path are expressed by the attenuation factor k. The delay by the time-of-flight appears in the correlation curve also. By acquiring several points of the correlation curve, the delay and hence the time-of-flight is extracted.

By exploiting modern semiconductor processing technologies such as standard CMOS or CCD processes, the correlating receivers can be miniaturized down to the micrometer range. This enables the realization of large arrays of correlator elements, which are usually exploited in optical time-of-flight measurement systems for enabling the parallel measurement of the distances to some thousands of object points. Real-time creation of distance map of the surrounding becomes feasible. The correlator elements are referred to as demodulation pixels in literature.

Referring to the example of sinusoidal modulation, the correlation curve being the result of the correlation between the detected sinusoidal modulation signal and the reference signal of sinusoid with same frequency is a sinusoid again. By sampling this sinusoidal correlation curve 402 at two points S0 and S1 separated by a quarter of the modulation period 408 as shown in FIG. 4, the time of flight is extracted as:

$$T = -\frac{T_m}{2\pi}\arctan\left[\frac{S0}{S1}\right]$$

where $T_m$ denotes one modulation period. The practical control of the space between the two samples can easily be achieved by changing the delay of the reference signal appropriately.

In particular, sinusoidal modulation has the advantage against pulse-chain modulation that the overall hardware components of the system might be optimized to just one specific frequency, while a pulse chain based system needs to support a broader bandwidth. In any case, two major drawbacks are common for continuous wave modulation.

First, the requirement of high-frequency modulation wave for obtaining lower measurement noise is in direct contradiction with the fact that higher frequencies directly lead to reduced non-ambiguous measurement range. Here non-ambiguous measurement range means that due to the 2pi ($\pi$) wrapping nature of the continuous modulation, objects located at distances beyond half of the wavelength are seen as close objects standing at a distance less than the half wavelength. Mathematically the maximum time-of-flight, which is non-ambiguously measurable, is:

$$T_{max} = T_m$$

Second, the superposition of several measurement systems' signals results in wrong measurements. Such an error cannot be compensated because it is not detectable. Thus, a system based on continuous wave modulation does not reliably function in a so-called multi-user environment.

Concerning 3D time-of-flight imaging cameras this is a major drawback in many applications where several systems need to operate simultaneously. A typical application is, for example, autonomous navigation of robots or vehicles.

SUMMARY OF THE INVENTION

The disclosed modulation scheme enables the operation of 3D time-of-flight cameras in a multi-camera environment since the optical signal includes pseudo noise digital sequences that inherently suppress interfering camera signals. Furthermore, the new technique improves the measurement precision in a single-camera environment significantly if we compare the precision to the pure pseudo noise based modulation technique with the assumption of same optical average power and maximum measurement range.

The present invention is directed to the problem that pseudo noise based distance measurement systems suffer from high measurement noise compared to sinusoidal modulation schemes under the same measurement boundary conditions. These boundary conditions comprise particularly the same maximum measurement range and the same signal power.

The invention proposes the utilization of a new kind of digital modulation sequences that are based on a certain combination of pseudo noise maximal length sequences. The result has similar properties like pure pseudo noise sequences with regard to the suppression of interfering signals but the stochastic measurement precision has been improved significantly.

The optical modulation signal includes a maximal length pseudo noise sequence and a second version of the same sequence, which is shifted in time by two chip durations and digitally inverted. The result is a three level digital modulation signal in the optical domain.

In general, according to one aspect, the invention features, an optical time of flight measurement system comprising an illumination source that illuminates an object with optical pseudo noise sequences that have three or more digital levels and a sensor for detecting the optical pseudo noise sequences from the object and deriving a distance to the object.

In preferred embodiments, the illumination source comprises two or more illumination units that generate the three or more digital levels. The sensor preferably comprises a demodulation sensor array including a two dimensional array of demodulation pixels.

The optical pseudo noise sequences can be generated by combining a sequence with a delayed version of the sequence. Maximal length sequences are currently preferred.

In general according to another aspect, the invention features an optical time of flight measurement method comprising illuminating an object with optical pseudo noise sequences that have three or more digital levels and detecting the optical pseudo noise sequences from the object and deriving a distance to the object.

In general according to still another aspect, the invention features an illumination source for an optical time of flight measurement system comprising a first illumination unit that illuminates an object with a modulated optical signal, a second illumination unit that illuminates the object with a modulated optical signal, and illumination controller that drives the first illumination unit and the second illumination unit to illuminate the object with a modulated optical signal that has three or more digital levels.

In general according to still another aspect, the invention features an illumination method for an optical time of flight measurement system comprising illuminating an object with a first modulated optical signal, illuminating the object with a second modulated optical signal, and controlling the timing of the first modulated optical signal and the second modulated optical signal so that the object is illuminated with a modulated optical signal that has three or more digital levels.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 16A shows the Fibonacci implementation and FIG. 16B shows the Galois implementation.

DETAILED DESCRIPTION OF THE PREFERRED EMBODIMENTS

Pseudo Noise Based Measurement

Figure 5:
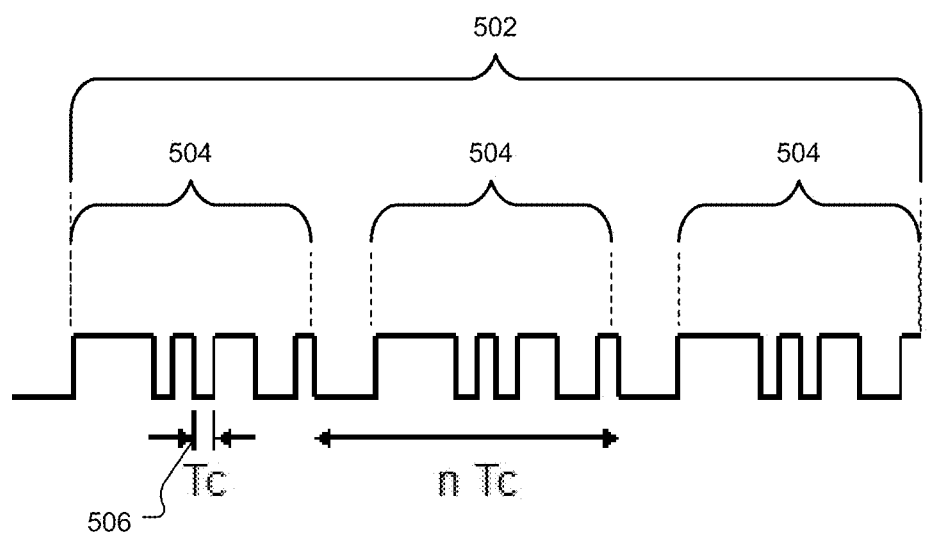
FIG. 5 illustrates a 15 bit (chip) long maximal length sequence.

An alternative modulation scheme comprises binary pseudo random sequences. Among many different types of pseudo random sequences, the so-called maximal length sequences or m-sequences are mostly used in today's time-of-flight distance measurement systems. They are easily generated with the use of linear feedback shift registers and they belong to the special sub-group of pseudo random sequences, which is the group of pseudo noise sequences. Sequences of this group fulfill all criteria for randomness at the same time, even though they are systematically generated Hans-Jürgen Zepernick, Adolf Finger, "Pseudo Random Signal Processing, Theory and Application", Wiley, 2005. An example of a maximal length sequence 502 repeated several times 504 is shown in FIG. 5. Generally, one bit is referred to as a chip within the context of pseudo noise sequences. The chip length is Tc and the sequence has n chips.

The modulation with pseudo noise sequences still shows the trade-off between higher modulation bandwidth with its accompanying lower noise but reduced measurement range. If we speak about higher bandwidth in the context of pseudo noise sequences, this means shorter chip (bit) duration. Despite the trade-off, two major benefits may be pointed out in comparison to the continuous wave modulation.

First, the measurement is not that strongly limited by the ambiguity of the distance measurement as it is for continuous wave modulation. In fact, by choosing arbitrary long pseudo noise sequences the range of non-ambiguity measurements tends to infinity. This is even the case when very high bandwidth is chosen in order to maximize the measurement accuracy.

Second, the random properties of pseudo noise modulation signals allow for distinguishing the signal from any other interfering signal in a non-ambiguous fashion. This is not easily achievable with a continuous wave modulation scheme. Usually, continuous wave modulation would require the use of several frequencies as well, which in turn leads to either subsequent measurements or parallel measurements but with reduced sensitivity because of the integration of two receivers. Both are not necessary for pseudo noise based measurements.

Distance measurement based on pseudo noise modulated signals typically applies the correlation approach as follows. A pseudo noise sequence PN_u(t) is used to modulate the emitted signal.

$$e(t)=PN\_u(t)$$

In case of intensity modulation, the pseudo noise sequence itself is a unipolar binary sequence having the values 0 or 1. This is denoted by the u subscript. The reference signal r(t) is assigned by the same pseudo noise sequence but in bipolar fashion (values of −1 and 1). Thus, it is referred to as PN_b(t).

$$r(t)=PN\_b(t)$$

Figure 3:
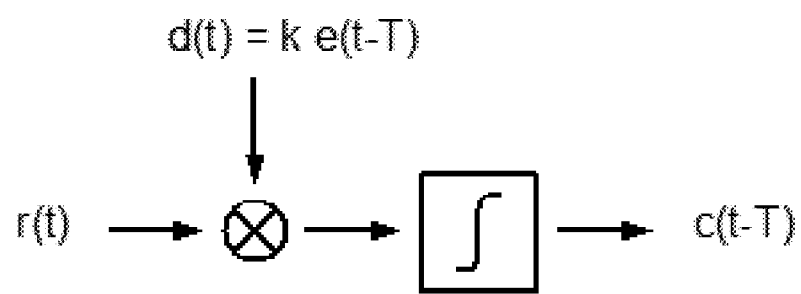
FIG. 3 illustrates a receiver-wise incorporated correlator.
Figure 4:
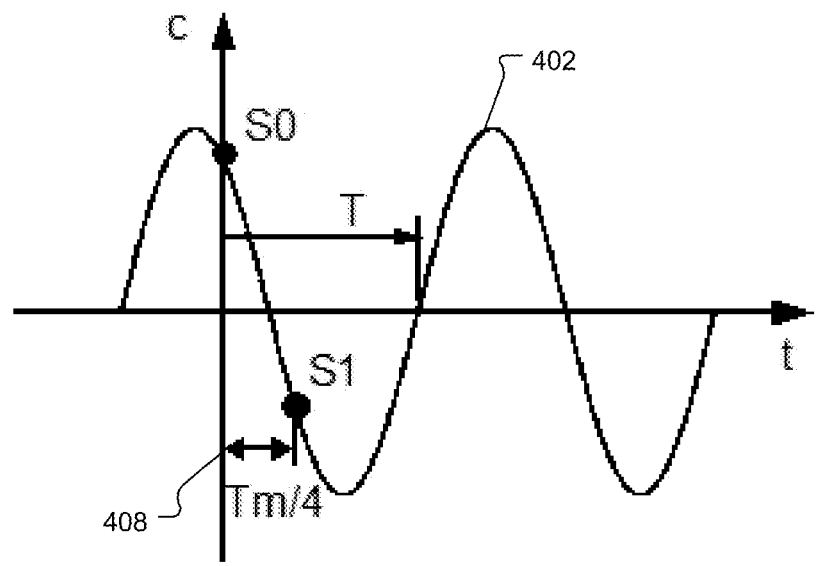
FIG. 4 illustrates typical sampling of the sinusoidal correlation curve in order to extract the time delay T of the sinusoid.

The reference signal is used as the mixing signal according to FIG. 3. It would also be possible to use a unipolar sequence. This is depending on the hardware set-up respectively the logical interpretation after the mixing process. A subsequent integration of the mixed signal outputs the correlation value between the detected signal d(t) and the reference signal r(t). Due to the time-of-flight, the emitted pseudo noise sequence experiences a delay by T.

Figure 6:
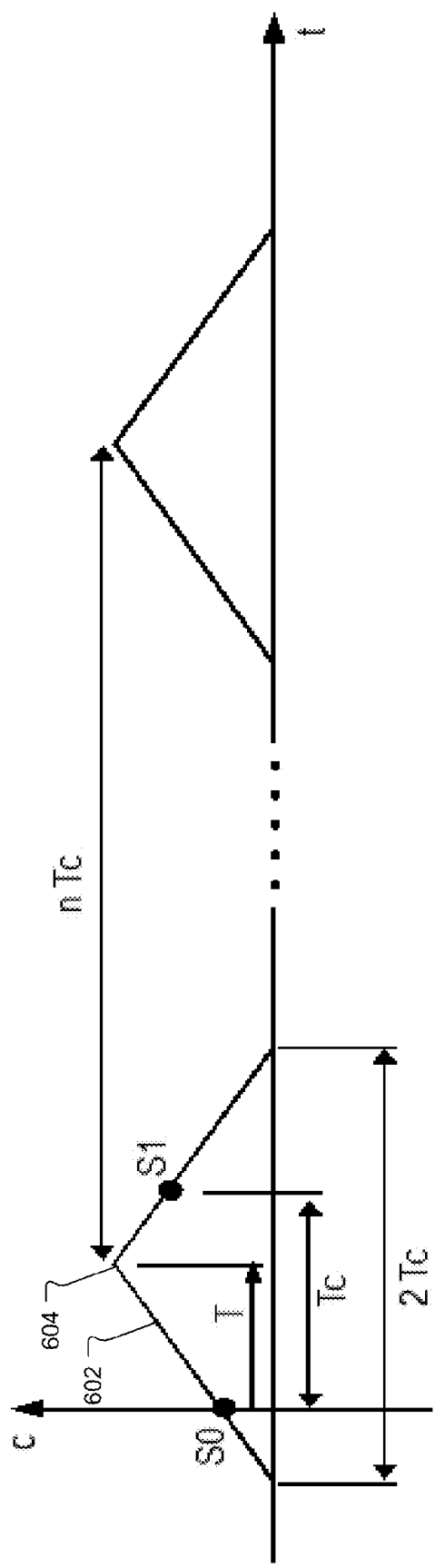
FIG. 6 illustrates a correlation curve when pseudo noise modulated signals are used for distance measurement.

If we assume that the maximal length sequence has more ones than zeros according to the unbalance property of those sequences, the correlation curve obtained from the correlation between the emitted signals e(t) and the reference signal r(t) is shown in FIG. 6. The correlation curve 602 is characterized by a peak 604 whose width is two times a chip duration Tc, whose amplitude is the energy of the pseudo noise sequence and whose repetition distance is the same like the length n of the pseudo noise sequence. If the number of n chips per sequence is a large number, the peak distances are separated accordingly.

Depending on the time-of-flight, the object's distance, which is a corresponding point on the correlation curve, is measured. In order to make the distance measurement independent on the signal's amplitude, two samples of the correlation curve are generally taken and used for the computation of the time-of-flight. See Bernhard Büttgen, "Extending Time-of-Flight Optical 3D Imaging to Extreme Operating Conditions", Dissertation University of Neuchatel, 2007. While the time period between the two samples could arbitrarily be chosen, the two samples are separated by one chip duration. The time-of-flight is computed as:

$$T = \frac{S0}{S0+S1} T_c$$

Where S0 and S1 are the two samples of the correlation curve as shown in FIG. 6. Assuming a very large number n of chips, the next peak of the correlation curve corresponds to objects at far distances, which are not reflecting any signal, in most real-world environments. In this case, the maximum time-of-flight that is non-ambiguously measurable is $$T_{max} = T_c$$

Since both samples of the correlation curve become zero for time-of-flights T>2Tc, objects beyond the two times the maximum measurement range are neither wrongly measured nor detected. Time-of-flight values between $T_c$ and $2T_c$ allow the time-of-flight distance measurement systems to detect the objects but not accurately their distance, because just one of the two samples is unequal to zero.

Using pseudo noise sequence modulation as described above, the distance measurement noise gets worse in comparison with sinusoidal modulation when the same maximum measurable distances are assumed, which is the case when $$T_c = T_m$$

Figure 7:
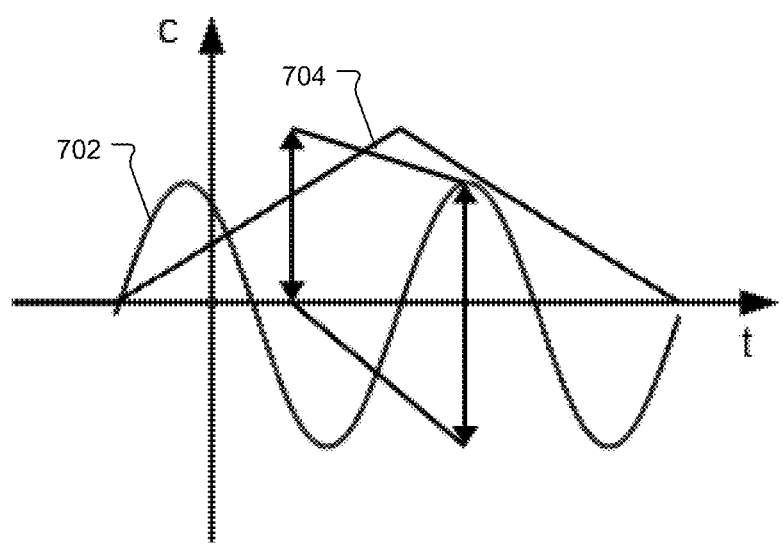
FIG. 7 illustrates overlaid correlation curves of sine wave and pseudo noise modulation for the same maximum measurement range (Tm=Tc) and same signal power.

An explanation of the decreased performance occurs when overlaying the correlation curves of sine waves 702 and pseudo noise modulation 704 as shown in FIG. 7. The correlation curve of two sine waves shows a peak to peak range that is larger than pseudo noise correlation curves as indicated by the two arrow lines showing the signal ranges. This is due to the fact that the sine correlation goes from maximum similarity to the opposite case being maximum disparity when the two sine waves are reversed to each other. But the pseudo noise correlation shows either maximum similarity or the sequences do not correlate with each other at all. There is no situation of shift between two pseudo noise sequences so that they are reversed to each other. This higher peak to peak range of the sine correlation allows for better noise performance. Another one is that the peak must cover two modulation periods of the sine wave in order to reach the same maximum measurement range, which means a further decrease of the peak's slope.

Figure 8:
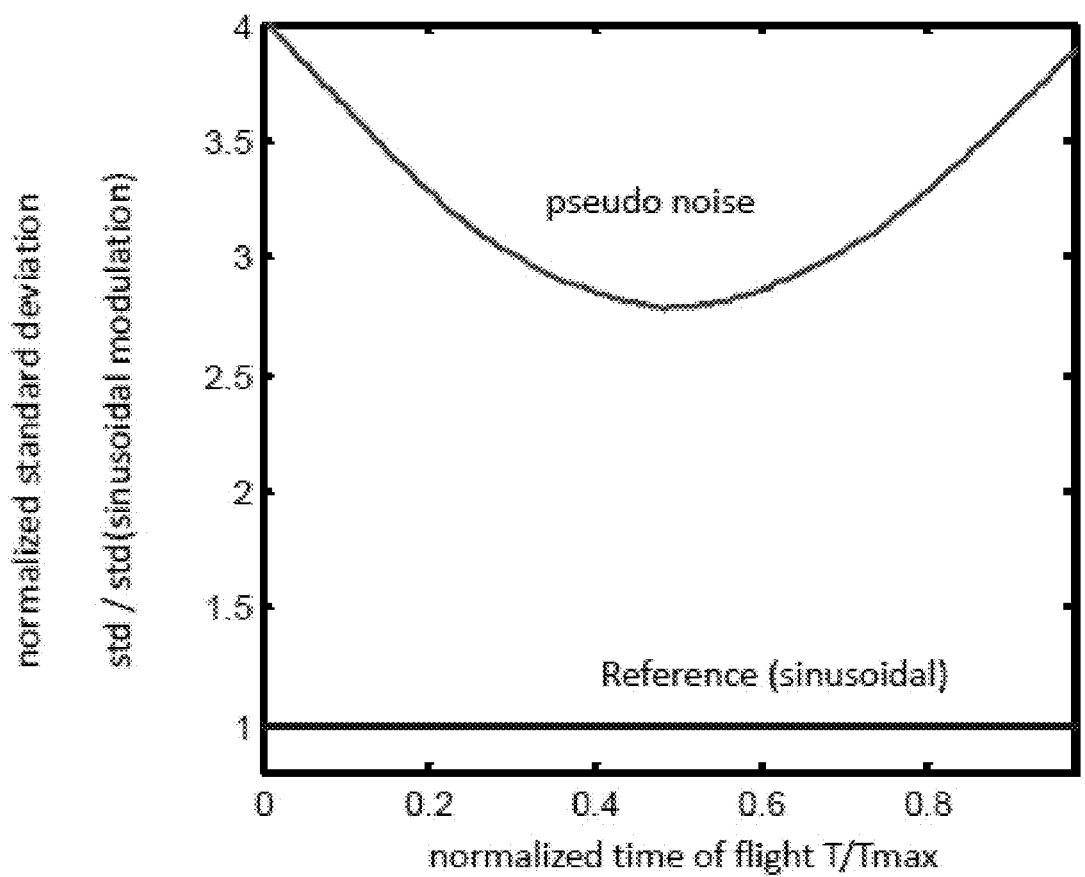
FIG. 8 illustrates a comparison of the measurement precision between sinusoidal modulation and pseudo noise digital modulation based on maximum length sequences.

FIG. 8 illustrates another evaluation of the noise performance with sinusoidal and pseudo noise modulation. FIG. 8 shows the normalized standard deviation versus the time-of-flight, where the normalization is related to the standard deviation obtained with sinusoidal modulation. While the performance of a sinusoidally modulated measurement system only depends on the optical power but not on the time-of-flight itself, the pseudo noise modulation is also time-of-flight dependent. The samples are assumed to be photon shot noise limited. The sinusoidal modulation gives 2*sqrt(2) to 4 times lower noise than pseudo noise modulation.

In the preferred embodiment, the optical modulation signal 114 includes a maximal length pseudo noise sequence and a second version of the same sequence, which is shifted in time by two chip durations and digitally inverted. The result is a three level digital modulation signal in the optical domain and follows the mathematical description as:

$$e(t) = PN\_u(t) + \underbrace{[1 - PN\_u(t - 2T_c)]}_{\overline{PN\_u(t-2T_c)}}$$

Figure 9:
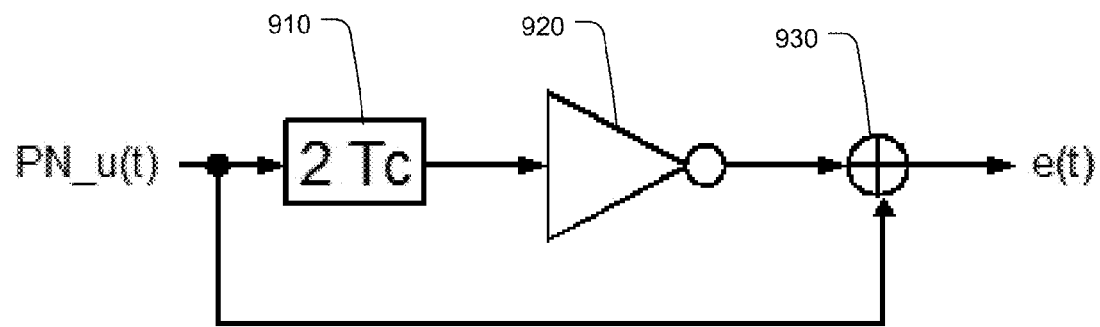
FIG. 9 illustrates the generation of the ternary digital modulation sequence.

FIG. 9 shows the generation of the ternary digital modulation sequence. A two chip delay 910 along with an inverter 920 follows by an adder 930 is provided.

The reference signal is still the pure pseudo noise binary sequence:

$$r(t) = PN\_b(t)$$

Figure 10A:
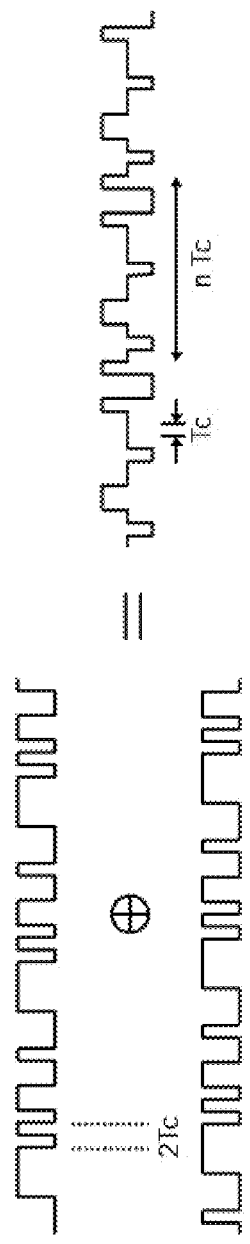
FIG. 10A illustrates the ternary digital modulation sequence.

FIG. 10A is an example of a ternary sequence of 15 chips length that includes two maximal length pseudo noise sequences of length of 15 chips and shifted by each other by $2 \times T_c$ according to the invention.

The correlation process leads to the output of a correlation function that corresponds to the superposition of the original correlation function of the pseudo noise sequence with the delayed version by two chip durations. The correlation function is shown in FIG. 10B.

Figure 10B:
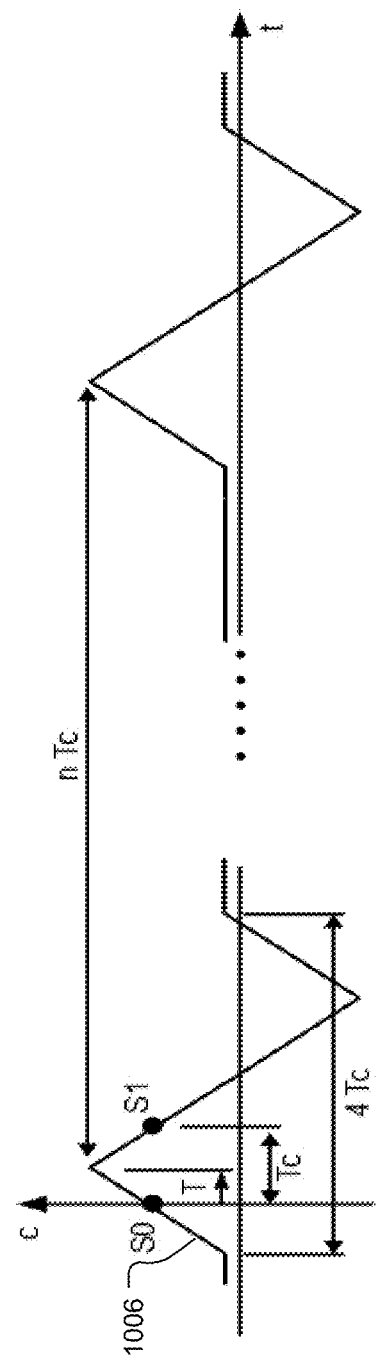
FIG. 10B illustrates the correlation function obtained with ternary digital modulation.

In a typical implementation, the distance is measured by taking two samples S0 and S1 of the correlation curve 1006 as shown in FIG. 10B. Basically, there is a very small offset of the triangular correlation curve produced by the one chip unbalance of the maximal length sequences. If it is assumed that the offset is negligibly small, the following conditions are used to extract the time-of-flight.

$$T = \begin{cases} \frac{1}{3} \cdot \frac{S0}{S1+S0} \cdot T_c & \text{for } S0 \leq 0 \wedge S1 \leq 0 \\ \frac{1}{3} \cdot \left[1 + \frac{S1}{S1-S0}\right] \cdot T_c & \text{for } S0 < 0 \wedge S1 > 0 \\ \frac{1}{3} \cdot \left[2 + \frac{S0}{S0+S1}\right] \cdot T_c & \text{for } S0 \geq 0 \wedge S1 \geq 0 \end{cases} \quad \text{Equation 1}$$

The maximum time that can be measured is $$T_{max} = 3T_c$$

The assumption of a negligible offset is valid for long sequence length, meaning large numbers of n. If, however, the offset is not negligible, which is the case for small n, then the linearity of the distance measurement is strongly affected.

Figure 11:
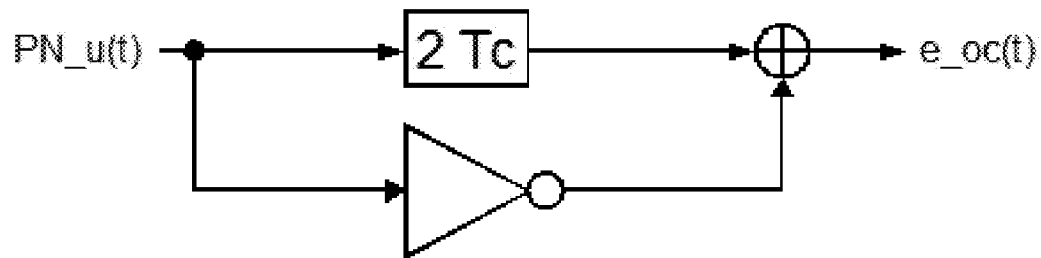
FIG. 11 illustrates the generation of the ternary digital modulation sequence used for compensating the offset in the correlation function, which has been produced by the one chip unbalance property of the maximal length sequence.

In the case of small n, two solutions are suggested. The first option comprises the accomplishment of two additional measurements with an adapted modulation scheme are required to enable the removal of the offset of the correlation curve and the improvement of the measurement linearity. The emitted optical signal used for offset compensation is:

$$e\_oc(t) = 2 - e(t) = \overline{PN\_u(t)} + PN\_u(t-2T_c)$$

while the reference signal is kept the same. FIG. 11 illustrates the generation of the ternary digital modulation sequence used for compensating the offset in the correlation function, which has been produced by the one chip unbalance property of the maximal length sequence.

Figure 12:
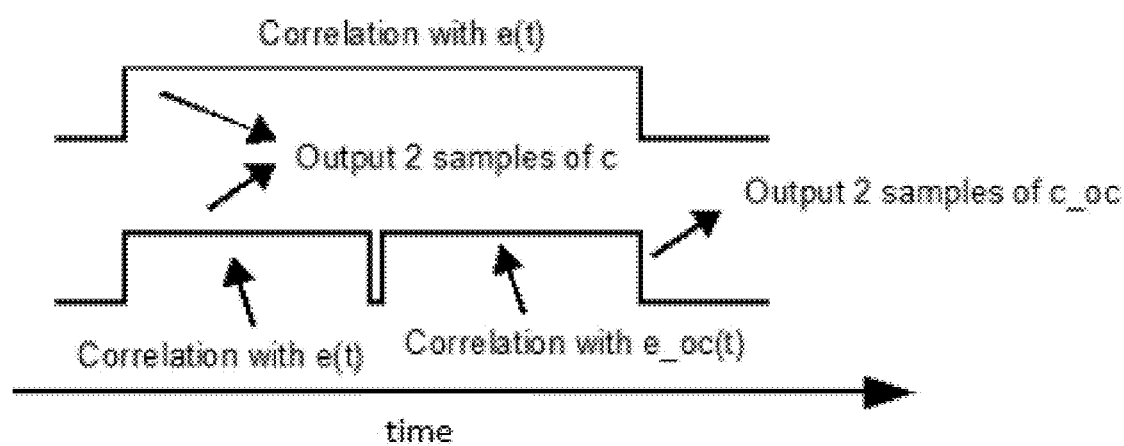
FIG. 12 illustrates the correlation process with and without taking additional samples for removal of the correlation curve's offset.
Figure 13:
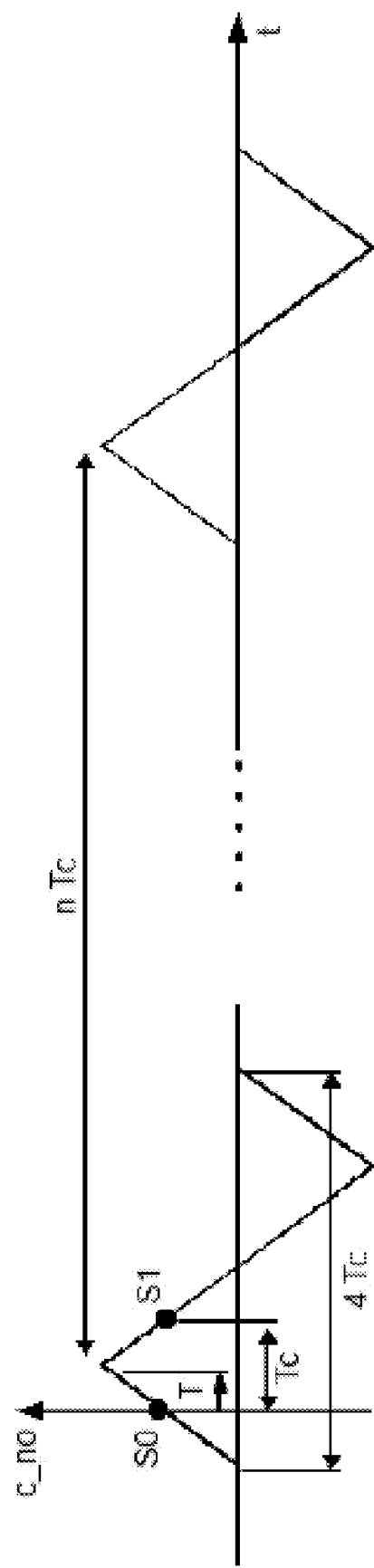
FIG. 13 illustrates the correlation function obtained when ternary digital modulation is used and two additional measurements are performed with the negative digital sequence in order to remove correlation mismatch.

FIG. 12 shows an example how the second measurement is performed. Without restricting the generality we subdivide the correlation process into two equal time durations for the correlations with e(t) and e_oc(t). The outcome of the correlation with e(t) is still defined to be c, while the outcome of the correlation with e_oc(t) is defined as c_oc. By subtracting the two correlation curves c_oc and c from each other respectively the corresponding samples, we obtain a sampling of an offset-compensated correlation curve as shown in FIG. 13.

The final correlation curve is referred to as c_no, where 'no' stands for no offset. Based on two samples of this correlation curve and employing Equation 1 the distance measurement does not show any non-linearity anymore over the measured time-of-flight.

The offset-compensated correlation values are obtained by the subtraction as described above or shown in mathematical sense as $$c\_no(t) = c(t) - c\_oc(t)$$

The samples to be taken are the difference of the samples described as $$S1\_no = S1 - S1\_oc$$

$$S0\_no = S0 - S0\_oc$$

This same offset compensation method not only corrects for the inherent offset generated by the chip unbalance, but it also compensates for offset mismatches in the two output channels of the demodulating element. A similar approach to compensate for channel response mismatches for continuous wave modulation systems has been described in [LUS05] F-Lustenberger, T. Oggier, G. Becker, L. Lamesch, Method and device for redundant distance measurement and mismatch cancellation in phase measurement systems", U.S. Pat. No. 7,462,808.

Applying this offset compensation method on ternary modulation signals as disclosed, it does not matter whether the unbalance property of pseudo random signals result in a higher occurrence of ones or zeros within the underlying pseudo noise sequence. The result of an uncompensated correlation curve or samples is obtained for any case.

Figure 14:
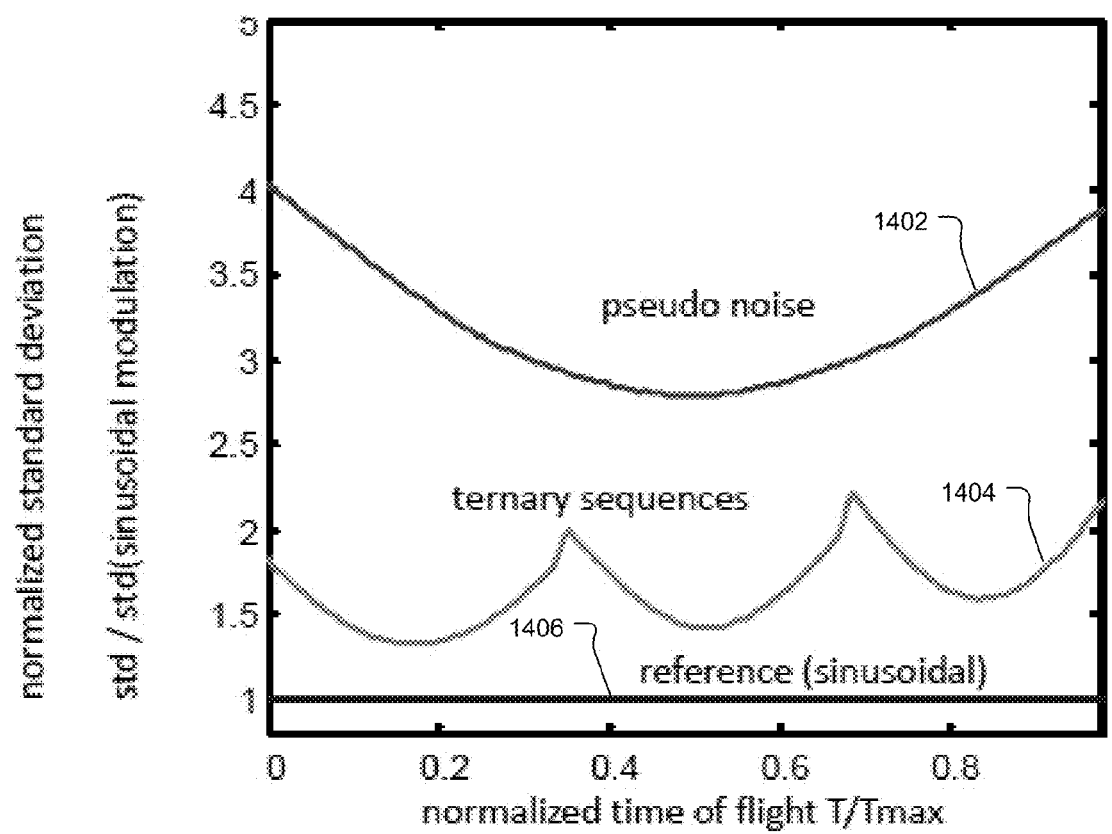
FIG. 14 illustrates the comparison of the measurement precision achieved with different modulation schemes as sinusoidal, pseudo noise maximal length sequence and three level (ternary) digital modulation sequences of maximal length sequences.

The comparison of the performance of this measurement system with pure pseudo noise based and sinusoidal based modulation systems is shown in FIG. 14, where the standard deviation of the distance measurement is related to the one of the sinusoidal modulation 1406. Assuming the same measurement range for all three kinds of modulation schemes and the same average optical power emitted, the ternary digital modulation scheme 1404 provides a possibility to increase the stochastic precision compared to the pseudo noise modulation 1402 and still inherently suppresses signals of other cameras thanks to the orthogonal properties of the pseudo noise-based signal build.

Another method to achieve an offset-compensated correlation curve with ternary modulation signals according to the invention uses a time division interleave of two or more ternary signals, preferably an even number of signals. If n is the number of chips per coded ternary sequence (CTS) that has been generated according to FIG. 9, a new signal is generated by adding subsequently in time one or several CTS signals. The subsequent CTS are based on the same maximal length pseudo noise sequence. The necessary boundary condition for achieving an offset-compensated correlation curve is that the sequences are alternately based on the pseudo noise sequence, once with more ones and once with more zeros.

Figure 15:
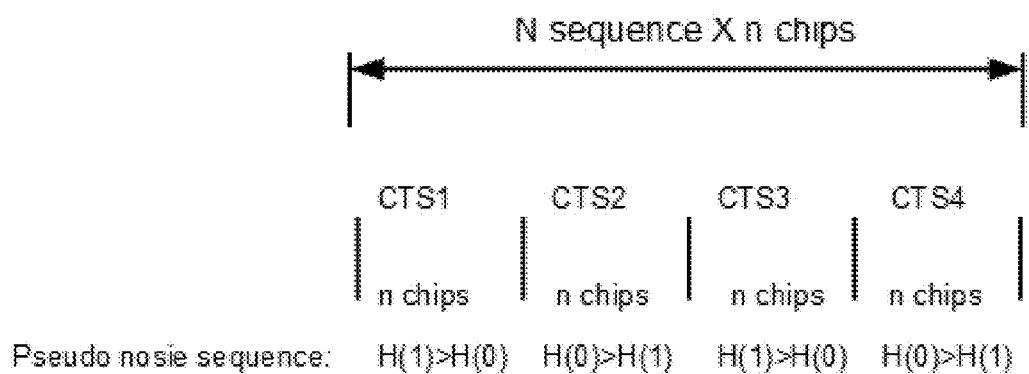
FIG. 15 shows an extended ternary modulation signal based on the time division interleave of several coded ternary signals; this signal construction provides an offset-free correlation curve when being correlated with the pseudo-noise maximal length sequence.

FIG. 15 sketches the idea of time-division based interleave of several coded ternary sequences in order to obtain an offset-free correlation function when correlating the modulation signal with the basic maximal-length pseudo-noise sequence. H(1) and H(0) describe the occurrences of ones and zeros within the pseudo noise sequence that has been used for the construction of the CTS. Due to the unbalance property of the pseudo noise sequences, they are not the same. The extended time-division based interleaved modulation signal requires the alternation in time that the pseudo noise sequences have more ones or zeros.

The extended ternary modulation signal following the construction results in a correlation function as shown in FIG. 13 without requiring the acquisition of a second measurement for any offset or mismatch compensations.

Figure 16A:
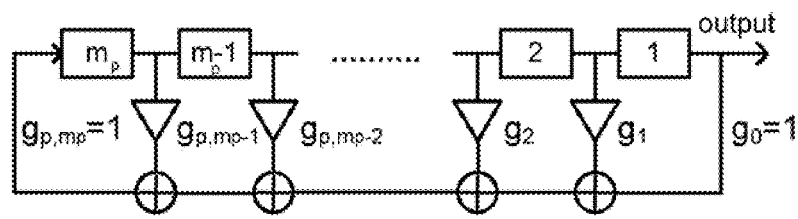
FIGS. 16A and 16B illustrate the pseudo noise sequence generation using linear feedback shift register.
Figure 16B:
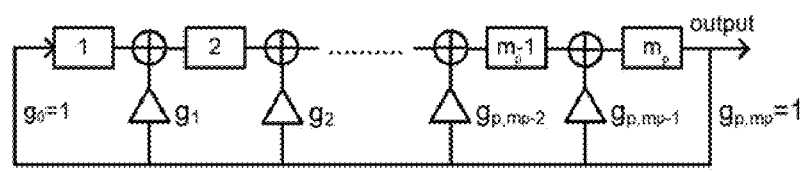

Pseudo noise sequences are fundamentally used for the construction of coded ternary sequences CTSs according to the invention. The generation of pseudo noise sequences is well known today, it is usually done by the use of linear feedback shift registers. Two famous implementations are shown in FIGS. 16A and 16B, Fibonacci and Galois implementation. Both implementations produce the same binary sequences when their feedback taps are of reversed nature. The produced pseudo noise sequence has a length of n=2^mp−1 chips, where mp denotes the length of the linear feedback shift register. The feedback polynomials need to be primitive in order to get a maximal length sequence. They are described by the coefficient g1 to gp,mp.

Generation of Optical 3-Level Sequences

Figure 17:
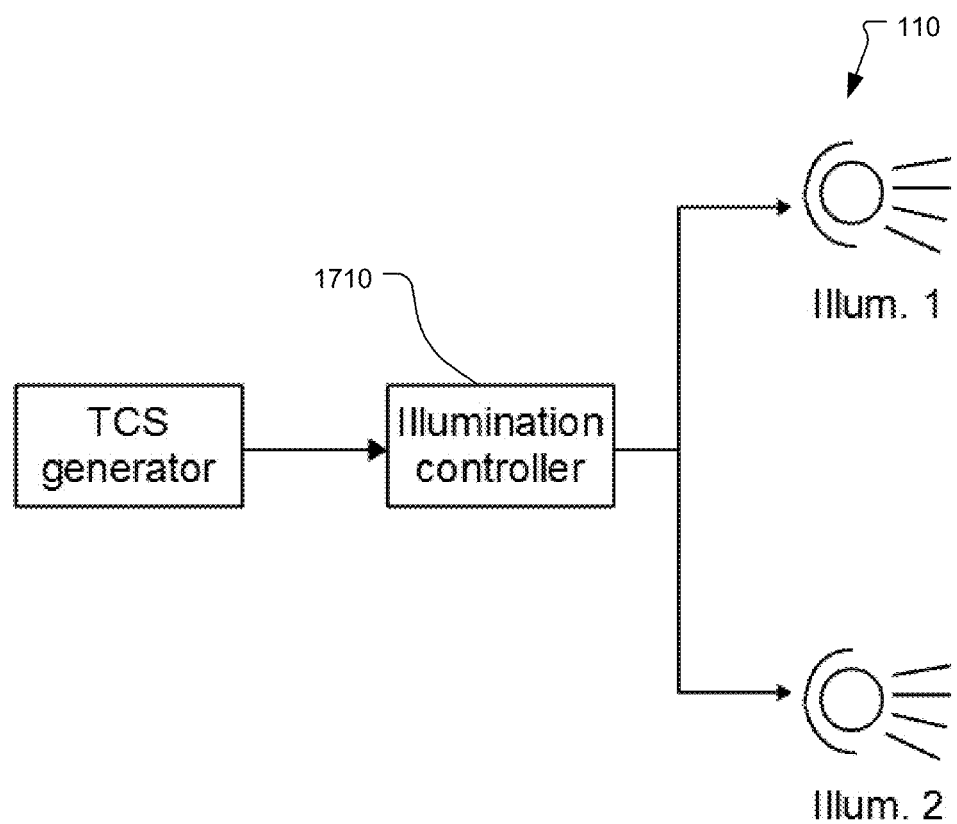
FIG. 17 shows the general illumination control set-up for two illumination channels.

Preferred generation schemes for coded ternary sequences are already shown. The ternary coded sequence controls the illumination, which is comprised of at least two separately controllable channels. As an example, the general set-up for two separate illumination channels is shown in FIG. 17. If the sequence requires the emission of a digital 1, just one illumination unit Illum 1 is activated by the illumination controller 1710. If a digital 2 is emitted, both illumination sources Illum 1 and Illum 2 are activated.

Figure 1:
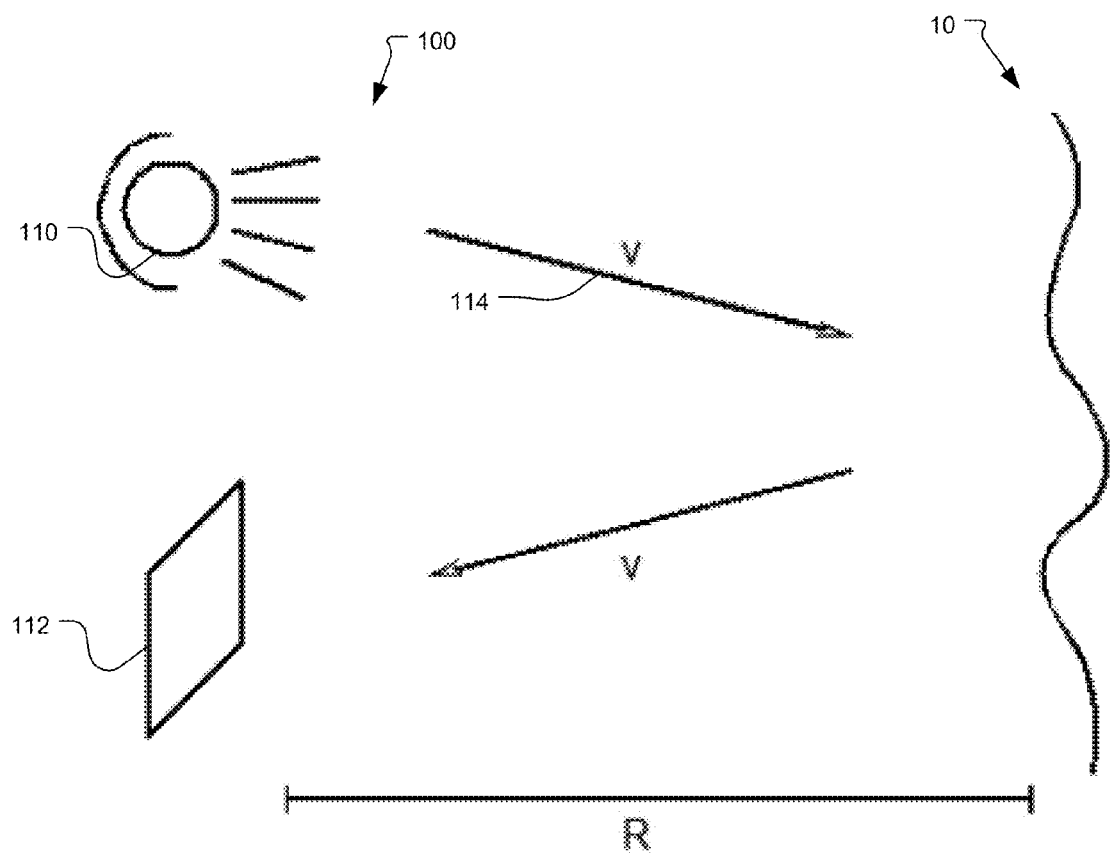
FIG. 1 illustrates a general time-of-flight measurement set-up.
Figure 2:
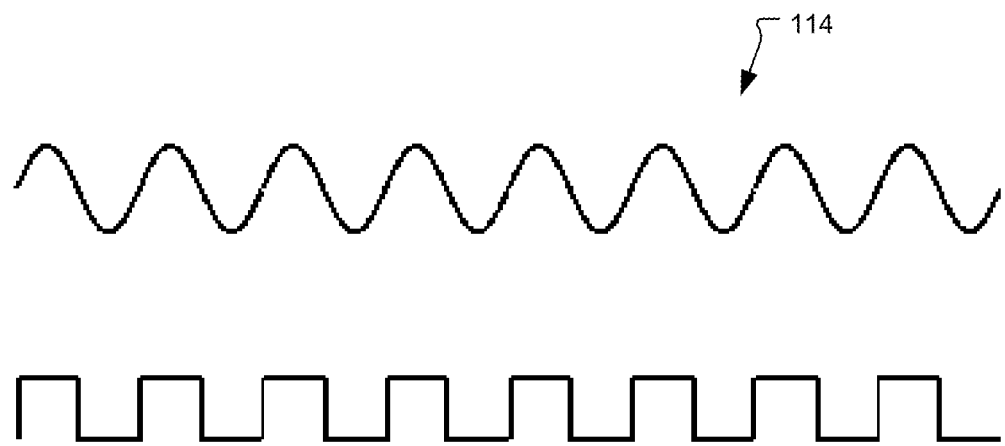
FIG. 2 illustrates sinusoidal wave and pulse chain signals.
Figure 18:
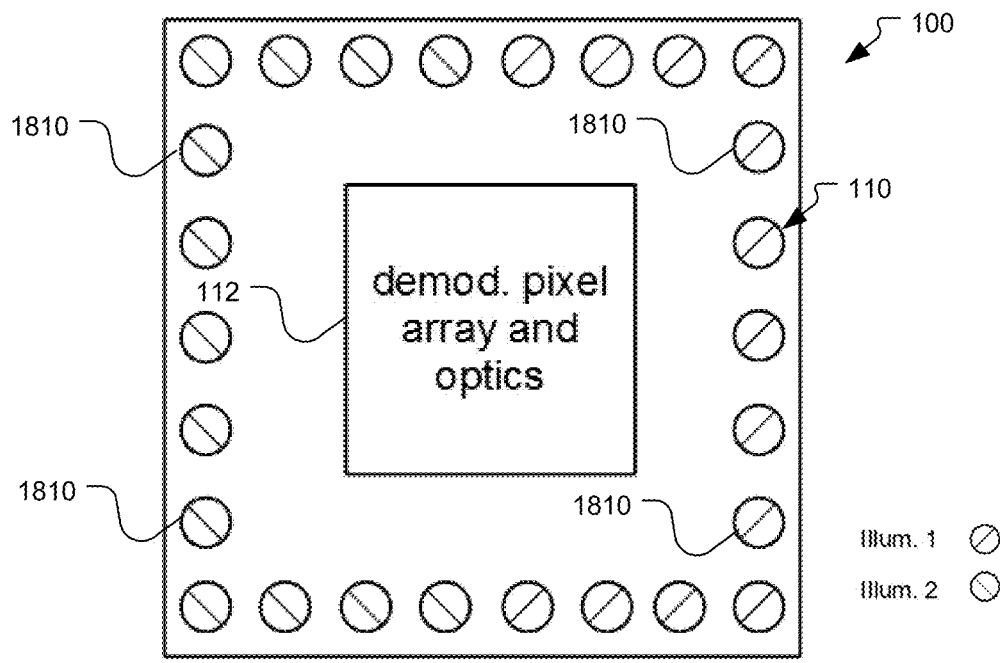
FIG. 18 shows the organization of two illumination units around the demodulation pixel array and the optics. The two illumination units have several optical sources each. The example shows a strict separation of both illumination units on the left and right side.
Figure 19:
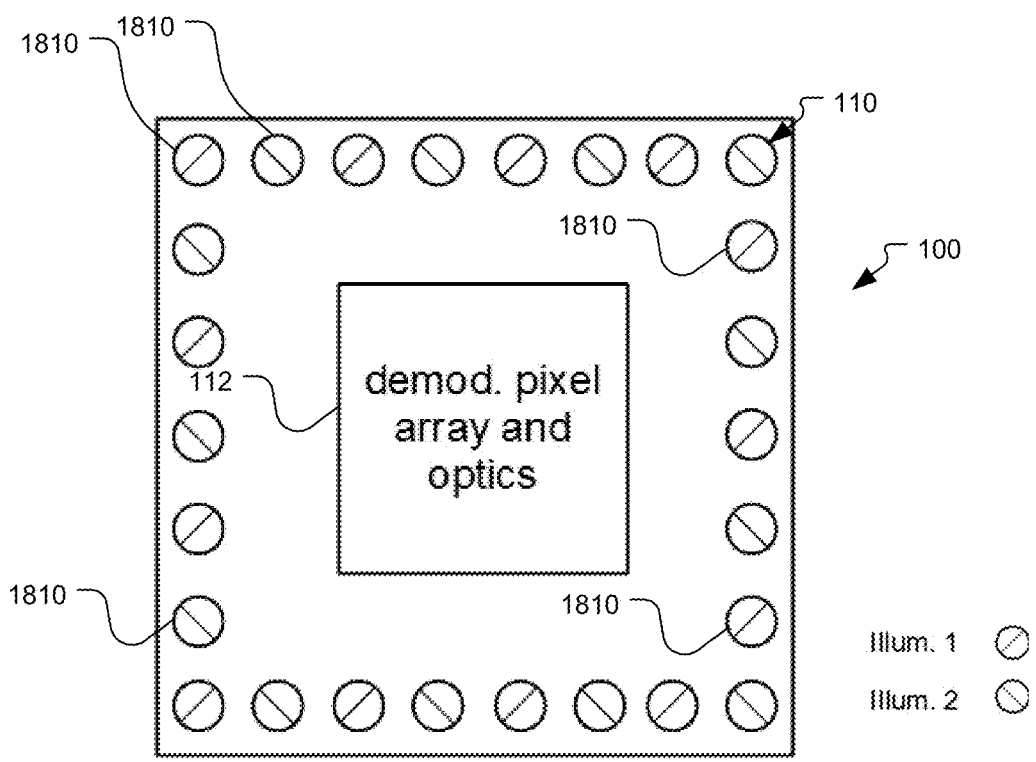
FIG. 19 shows the organization of two illumination units around the demodulation pixel array and the optics. The two illumination units have several optical sources each. The example shows an alternating arrangement of the optical source from illumination units 1 and 2.

FIG. 1 shows the general set-up of a time-of-flight measurement system. Usually, the illumination units 110 organized around the demodulation pixel array 112 in the time-of-flight measurement system 100. The demodulation array 112 preferably comprises a two dimensional array of demodulation pixels. FIGS. 18 and 19 show examples with two illumination units Illum 1 and Illum 2 used to create the ternary level optical output signal. The two illumination units have several illumination sources 1810, such as laser diodes or LEDs, each, whose arrangement around the pixel array 112 is shown in the figures. A straight forward implementation is shown in FIG. 18, where the right illumination sources Illum 1 belong to illumination unit 1 and the left sources Illum 2 belong to illumination 2.

In reality the optical sources are expected to have mismatching properties that show up in differences in response characteristics in terms of power and speed. If the illumination units Illum 1 and Illum 2 are strictly separated as shown in FIG. 18, this might strongly produce non-uniform illumination of the scenery. In order to compensate for that another arrangement of the illumination sources is proposed in FIG. 19, where the sources are alternating from illumination 1 and 2 Illum 1 Illum 2 locally.

In addition to such kind of systematic spatial placement of the illumination sources, also (pseudo) random arrangements are used on other embodiments.

Different scenarios of controlling the two or more illumination paths are imaginable. The following examples refer again to the special case of two illumination units, where each has several optical sources in order to increase the total optical emission power.

The illumination controller is used to distribute corresponding control signals to the illumination units. Four example schemes of activating the illumination modules are sketched in the following figures.

Figure 20:
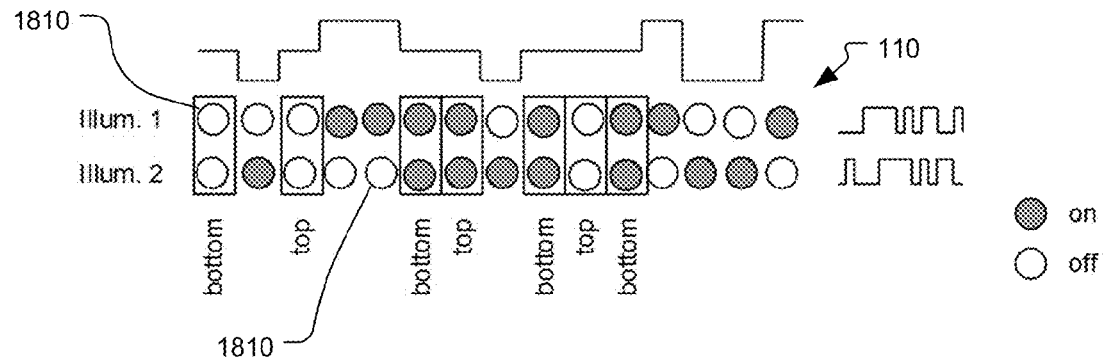
FIG. 20 shows the assignment of the raw pseudo noise sequences to the illumination units separately.

In FIG. 20, the two shifted versions of pseudo noise sequences, which are added together in order to result in the ternary optical output sequence, are assigned each to one of the illumination units.

Figure 21:
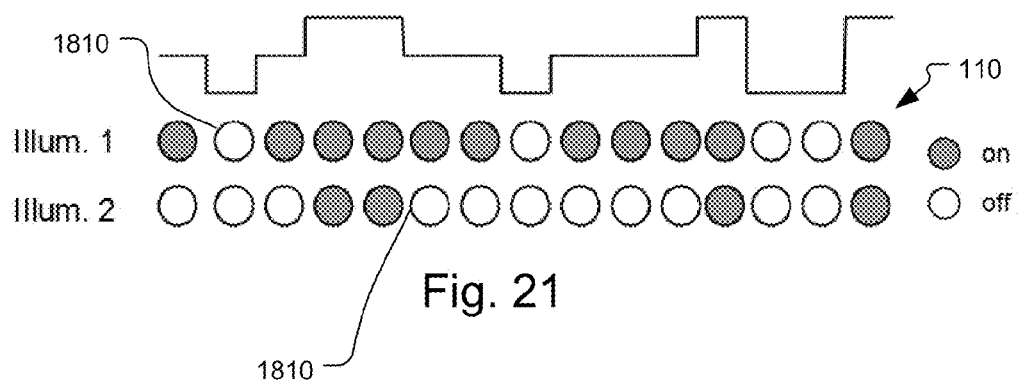
FIG. 21 shows the assignment of digital 1 to illumination unit 1 and digital 2 to both illumination units.

In FIG. 21, Illumination 2 is activated only if the ternary sequence returns digital 2. If the digital value is 1, only illumination 1 is switched on.

Figure 22:
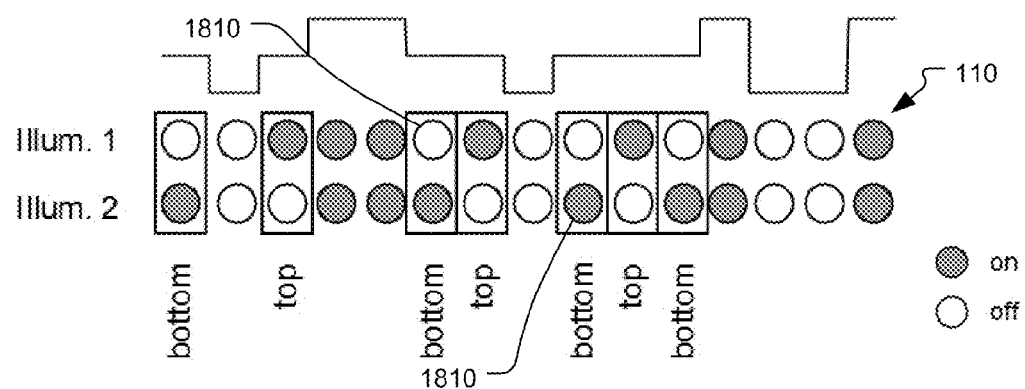
FIG. 22 shows the assignment of the digital 1 alternatively to illumination unit 1 and 2 compensating for time-wise and local illumination asymmetries.
Figure 23:
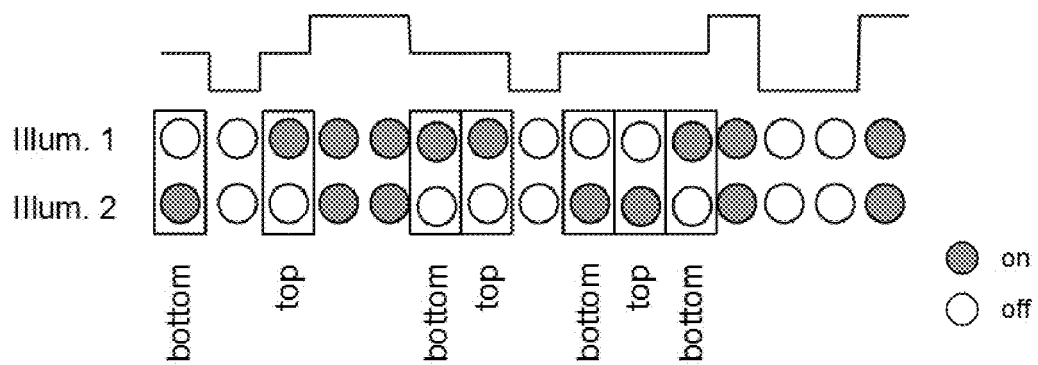
FIG. 23 shows the assignment of the digital 1 randomly to illumination unit 1 or 2.

FIG. 22 shows a signal assignment to the illumination units that compensates for any asymmetries of scene illumination over time or space. The digital 1 is alternatively activating either illumination unit 1 or 2, while digital 2 activates both illumination units. A random assignment of digital 1 to the illumination units is shown in FIG. 23 having the same purpose of compensating any asymmetries.

Another method to compensate for asymmetries locally or temporally is to alternate the assignment of the underlying pseudo noise sequences to the illumination units. A coded ternary sequence of double length is created when first the illumination 1 gets pseudo noise sequence 1 and pseudo noise sequence 2 is assigned to illumination 2 according to FIG. 17, and after that vice versa.

The above embodiments for compensation of local and temporal asymmetries could also be used to generate an optical modulation signal with just one illumination unit and two optical output levels (zero and one) but creating the same correlation characteristics as the pure ternary signals.

Figure 24:
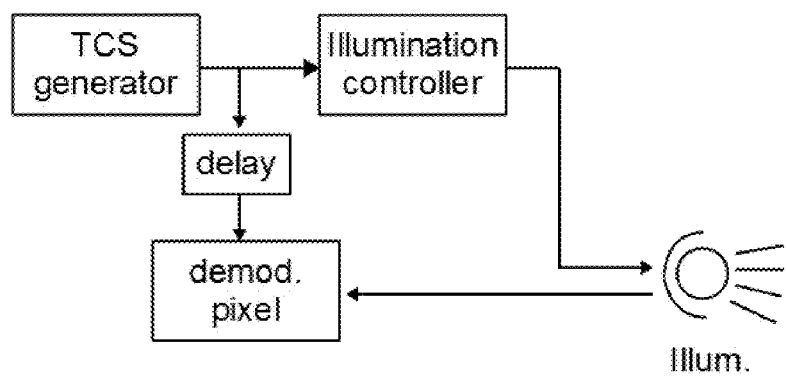
FIG. 24 shows the generation of a reference measurement by feeding back a small fraction of the emitted optical signal to a dedicated demodulation pixel.

This is particularly suited for feeding back a small fraction from just one illumination unit to a reference demodulation pixel as shown in FIG. 24. Such a reference measurement is important in time-of-flight systems for obtaining highly accurate and robust absolute distance measurements.

Adjustment to the Measurement Environment by Optical Power Control

In order to compensate for power mismatch between the illumination units and consequently to obtain the same peak height of the ternary sequence's correlation curve, the alternate illumination channel switching is a very attractive method as described above. The control of the optical power of the illumination units/channels, on the other hand, provides another degree of flexibility in the set-up of a time-of-flight system based on coded ternary signal modulation. This is particularly interesting for the direct pseudo noise signal assignment to the illumination units according to FIG. 20 or the corresponding embodiment with temporal alternation of the pseudo noise sequences.

Figure 25:
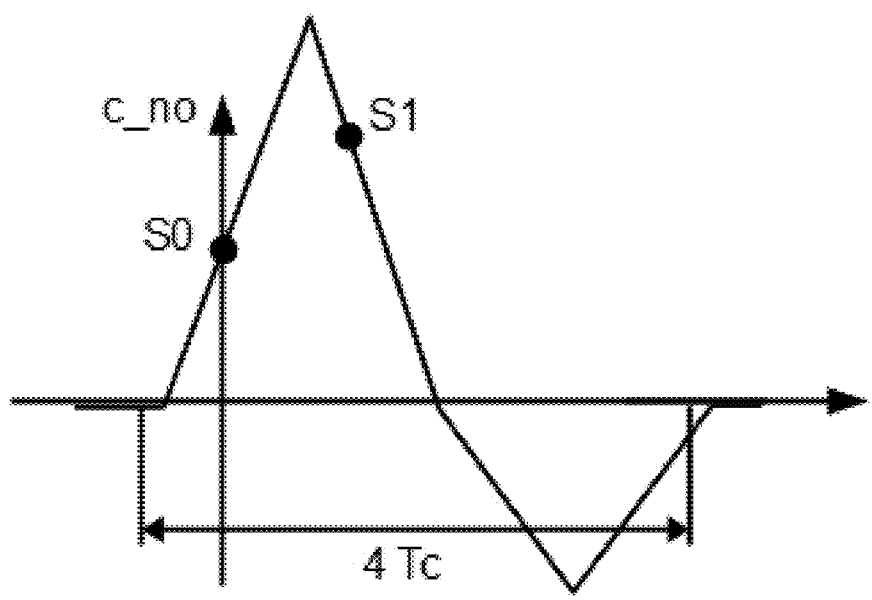
FIG. 25 shows the correlation curve when power adjustment is employed.

The optical power of the illumination channels could be controlled directly by the illumination controller. By adjusting the pseudo noise illumination channels in terms of power, the correlation curve's characteristics can be adjusted to the measurement range a-priori or dynamically during the measurement process. If for example P2>P1, where P1 corresponds to the optical emission power of the first illumination channel and P2 to the second one, respectively, the correlation curve could be adjusted to amplify the measurement precision for far objects. The first peak of the correlation curve, which is used for the detection of far objects gets more optical power showing up as a larger peak amplitude. Close objects generally leading to saturation are assigned to have less optical power. The correlation curve is shown in FIG. 25. An opposite adjustment for obtaining a larger second peak is possible as well and might be application-dependent.

Power Adjustment.

If the power adjustment is realized, the distance formulae must take into account the different slopes of the two peaks of the correlation curve, which requires the information of the power ratio between the illumination channels. If the power ratio is defined as RATIO=P2/P1, where P1 is the power of the illumination unit that generates the right peak with its pseudo noise sequence adjusted, then the time-of-flight is computed as:

$$T = \begin{cases} \frac{1}{3} \cdot \frac{S1}{S1+S0} \cdot T_{max} & \text{for } S0 \leq 0 \wedge S1 \leq 0 \\ \frac{1}{3} \cdot \left[1 + \frac{S0/\text{RATIO}}{S0/\text{RATIO}-S1}\right] \cdot T_{max} & \text{for } S0 < 0 \wedge S1 > 0 \\ \frac{1}{3} \cdot \left[2 + \frac{S1}{S0+S1}\right] \cdot T_{max} & \text{for } S0 \geq 0 \wedge S1 \geq 0 \end{cases}$$

The disclosed modulation scheme enables the operation of 3D time-of-flight cameras in a multi-camera environment since the optical signal has pseudo noise digital sequences that inherently suppress interfering camera signals. Furthermore, the new technique improves the measurement precision in a single-camera environment significantly if we compare the precision to the pure pseudo noise based modulation technique with the assumption of same optical average power and maximum measurement range. Smart control of the illumination units allow for compensating temporal or spatial asymmetries and/or for statically or dynamically adjust the emission power to the application-dependent measurement range and scenery.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical time of flight measurement system, comprising:
   an illumination source that illuminates an object with optical pseudo noise sequences that have three or more digital levels, wherein the optical pseudo noise sequences are generated by combining a sequence of optical signals with a delayed version of the sequence shifted in time by a plurality of chip durations; and
   a sensor for detecting the optical pseudo noise sequences from the object and deriving a distance to the object.

2. An optical time of flight measurement system as claimed in claim 1, wherein the illumination source comprises two or more illumination units that generate the three or more digital levels.

3. An optical time of flight measurement system as claimed in claim 1, wherein the sensor comprises a demodulation sensor array.

4. An optical time of flight measurement system as claimed in claim 3, wherein the sensor array comprises a two dimensional array of demodulation pixels.

5. An optical time of flight measurement system as claimed in claim 1, wherein the delayed version of the sequence is digitally inverted.

6. An optical time of flight measurement system as claimed in claim 1, wherein the sequence is a maximal length sequence.

7. An optical time of flight measurement method, comprising:
   illuminating an object with optical pseudo noise sequences that have three or more digital levels, wherein the optical pseudo noise sequences are generated by combining a sequence of optical signals with a delayed version of the sequence shifted in time by a plurality of chip durations; and
   detecting the optical pseudo noise sequences from the object and deriving a distance to the object.

8. An optical time of flight measurement method as claimed in claim 7, further comprising driving two or more illumination units that generate the three or more digital levels.

9. An optical time of flight measurement method as claimed in claim 7, further comprising detecting the sequences with a sensor that comprises a demodulation sensor array.

10. An optical time of flight measurement method as claimed in claim 9, wherein the sensor array comprises a two dimensional array of demodulation pixels.

11. An optical time of flight measurement method as claimed in claim 7, wherein the delayed version of the sequence is a digitally inverted version.

12. An optical time of flight measurement method as claimed in claim 7, wherein the sequence is a maximal length sequence.

13. An illumination source for an optical time of flight measurement system, comprising:
   a first illumination unit that illuminates an object with a modulated optical signal;
   a second illumination unit that illuminates the object with a modulated optical signal; and
   an illumination controller arranged to drive the first illumination unit and the second illumination unit such that the first illumination unit generates a sequence of optical signals and the second illumination unit generates a delayed version of the sequence shifted in time by a plurality of chip durations, wherein the sequence of optical signals and the delayed sequence are combined to illuminate the object with a combined modulated optical signal that has three or more digital levels.

14. An illumination method for an optical time of flight measurement system, comprising:
   illuminating an object with a first modulated optical signal comprising a sequence of optical signals;
   illuminating the object with a second modulated optical signal comprising a delayed version of the sequence shifted in time by a plurality of chip durations; and
   controlling the timing of the first modulated optical signal and the second modulated optical signal so that the object is illuminated with a modulated optical signal that has three or more digital levels.

15. An optical time of flight measurement method, comprising:
   illuminating an object with light modulated by optical pseudo noise sequences that have three or more digital levels, wherein the pseudo noise sequences are generated by combining a first sequence of optical signals with a delayed version of the first sequence shifted in time by a plurality of chip durations; and
   detecting the light from the object with a sensor that comprises a demodulation sensor with a two dimensional array of demodulation pixels that derives a distance to the object by correlating the optical pseudo noise sequences with the light returning from the object.

16. An optical time of flight measurement method as claimed in claim 15, wherein the delayed version of the sequence is a digitally inverted version of the first sequence.

17. An optical time of flight measurement method as claimed in claim 16, wherein the sequence is a maximal length sequence.

\* \* \* \* \*